(12) United States Patent
Rud et al.

(10) Patent No.: US 11,768,091 B2
(45) Date of Patent: Sep. 26, 2023

(54) THERMOWELL VIBRATION SENSING (71) Applicant: Rosemount Inc., Shakopee, MN (US)

(72) Inventors: Jason H. Rud, Chanhassen, MN (US); Kyle J. Kronforst, Shakopee, MN (US)

(73) Assignee: ROSEMOUNT INC., Shakopee, MN (US)

( * ) Notice: Subject to any disclaimer, the term of this patent is extended or adjusted under 35 U.S.C. 154(b) by 638 days.

(21) Appl. No.: 16/826,686

(22) Filed: Mar. 23, 2020

(65) Prior Publication Data
US 2021/0293589 A1    Sep. 23, 2021

(51) Int. Cl.
| | | |
|---|---|---|
| *G01F 1/325* | (2022.01) | |
| *G01K 13/02* | (2021.01) | |
| *G01K 1/08* | (2021.01) | |
| *G01K 7/16* | (2006.01) | |
| *G01H 11/08* | (2006.01) | |

(52) U.S. Cl.
CPC .......... *G01F 1/3266* (2022.01); *G01F 1/3273* (2022.01); *G01F 1/3287* (2022.01); *G01K 13/02* (2013.01); *G01H 11/08* (2013.01); *G01K 1/08* (2013.01); *G01K 7/16* (2013.01); *G01K 13/026* (2021.01)

(58) Field of Classification Search
CPC .... G01F 1/3266; G01F 1/3273; G01F 1/3287; G01K 13/02; G01K 13/026; G01K 1/08; G01K 7/16; G01H 11/08
USPC ............................. 73/861.22; 137/551, 552
See application file for complete search history.

(56) References Cited

U.S. PATENT DOCUMENTS

| | | | | |
|---|---|---|---|---|
| 5,212,421 A | * | 5/1993 | Hatton .................. | G01H 11/08 73/35.11 |
| 5,571,974 A | * | 11/1996 | Nauful ...................... | G01F 1/74 73/861.73 |
| 6,390,670 B1 | * | 5/2002 | Nimberger .............. | G01F 15/02 73/866.5 |

(Continued)

FOREIGN PATENT DOCUMENTS

KR    10-2013-0113202 A    10/2013

OTHER PUBLICATIONS

International Search Report, and Written Opinion dated Jun. 25, 2021, for International Patent Application No. PCT/US2021/021298, 13 pages.

*Primary Examiner* — Minh Q Le
(74) *Attorney, Agent, or Firm* — Christopher R. Christensen; KELLY, HOLT & CHRISTENSON PLLC (57) ABSTRACT

A process fluid temperature measurement system is provided. The process fluid temperature measurement system includes a thermowell configured to couple to a process fluid conduit and extend through a wall of the process fluid conduit. The process fluid temperature measurement system also includes a temperature sensor assembly disposed within the thermowell, the temperature sensor assembly including a sensor capsule having at least one temperature sensitive element disposed therein. The temperature sensor assembly also includes a vibration sensor coupled to the sensor capsule, the vibration sensor being configured to produce a vibration signal in response to detected vibration. The process fluid temperature measurement system further includes transmitter circuitry coupled to the vibration sensor and configured to receive the vibration signal and produce an output based on the received vibration signal.

12 Claims, 7 Drawing Sheets

(56) References Cited

U.S. PATENT DOCUMENTS

| | | | |
|---|---|---|---|
| 6,485,175 B1* | 11/2002 | Nimberger | G01K 13/02 |
| | | | 374/165 |
| 7,290,450 B2 | 11/2007 | Brown et al. | |
| 9,188,483 B2 | 11/2015 | Engelstad et al. | |
| 9,885,610 B2 | 2/2018 | Rud | |
| 10,156,480 B2 | 12/2018 | Bauschke et al. | |
| 2005/0066736 A1* | 3/2005 | Ohbayashi | G01H 11/08 |
| | | | 73/649 |
| 2011/0054822 A1* | 3/2011 | Bauschke | G01K 15/007 |
| | | | 374/163 |
| 2012/0237402 A1* | 9/2012 | Cantarelli | G01K 13/02 |
| | | | 422/111 |
| 2014/0128689 A1* | 5/2014 | Stewart | A61B 5/4528 |
| | | | 600/301 |
| 2014/0269828 A1 | 9/2014 | Engelstad et al. | |
| 2017/0122814 A1* | 5/2017 | Motooka | G01K 13/02 |
| 2017/0147057 A1* | 5/2017 | Emby | G06F 1/3231 |
| 2017/0255245 A1* | 9/2017 | Emby | G06F 1/3231 |
| 2020/0144481 A1* | 5/2020 | Bitou | G01P 15/0922 |
| 2020/0278240 A1* | 9/2020 | Sun | G01L 25/00 |
| 2020/0326228 A1* | 10/2020 | Nie | H01L 41/187 |

* cited by examiner

THERMOWELL VIBRATION SENSING

BACKGROUND

The present invention relates generally to process sensor systems, and more particularly to thermowell sensor housings for fluid sensors in industrial process monitoring systems.

Many industrial processes convey process fluids through pipes or other conduits. Such process fluids can include liquids, gasses, and sometimes entrained solids. These process fluids may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

Industrial process transmitters and sensor assemblies are used to sense various characteristics of process fluids flowing through a conduit or contained within a vessel, and to transmit information about those process characteristics to a control, monitoring and/or safety system remotely located from the process measurement location. Sensor assemblies may sense a variety of process parameters, including pressure, temperature, pH, or flow rate. Process transmitters are typically electrically connected sensor assemblies via sensor wires used to transmit current- or voltage-based analog sensor output signals reflecting at least one such process parameter. Each transmitter reads these sensor output signals and converts them into measurement of the process parameter. Finally, the transmitter sends the information to the control system.

It is common to place a temperature sensor within a thermowell, which is then inserted into the process fluid flow through an aperture in the conduit. When being inserted into the process fluid, the thermowell may experience dynamic stress imposed by varying conditions of process fluid flow. To aid in design, wake frequency calculations are typically performed for thermowell installations in order to keep the thermowell from being exposed to process conditions that would ultimately lead to fatigue due to vibration. However, this approach may not always be practical in that process characteristics or thermowell structure can change over time, resulting in premature failure. Accordingly, thermowells, while useful for providing a process seal for temperature sensors, have a number of limitations.

SUMMARY

A process fluid temperature measurement system is provided. The process fluid temperature measurement system includes a thermowell configured to couple to a process fluid conduit and extend through a wall of the process fluid conduit. The process fluid temperature measurement system also includes a temperature sensor assembly disposed within the thermowell, the temperature sensor assembly including a sensor capsule having at least one temperature sensitive element disposed therein. The temperature sensor assembly also includes a vibration sensor coupled to the sensor capsule, the vibration sensor being configured to produce a vibration signal in response to detected vibration. The process fluid temperature measurement system further includes transmitter circuitry coupled to the vibration sensor and configured to receive the vibration signal and produce an output based on the received vibration signal.

DETAILED DESCRIPTION OF ILLUSTRATIVE EMBODIMENTS

As set forth above, wake frequency calculations may be performed for thermowell installations to aid in its design. These calculations are implemented generally in order to keep the thermowell from being exposed to process conditions that would ultimately lead to fatigue due to vibration. Such systems generally utilize a process condition standard, wherein typical process conditions are loaded into the calculation at the time of calculating the wake frequency from varying process fluid flow.

The wake frequency calculation described above generally relies upon the assumption that process conditions within thermowell installations do not change over time. However, over time, changes in process characteristics or thermowell structure may occur, resulting in calculation error and/or premature failure. Additionally, when a process condition changes, vortices may be created within the process fluid. Vortices produced in the process fluid, if significant, can fatigue and/or fracture components of the thermowell installation. For example, if the created vortices reach a vortex-shedding frequency, that is, a frequency level capable of causing potential damage to the thermowell, the thermowell may fatigue, resulting in permanent damage. Further, if vortices reach the natural frequency of the thermowell, the thermowell may be significantly fatigued to the point where fracture may occur. The natural frequency may be specific to the particular type of thermowell employed and can thus be a broad range of different vibrational frequencies. Additionally, in some instances, the magnitude of the vortices is at a level significant enough to cause damage to components of the thermowell installation.

Implementing a sensor within the thermowell to sense vibration is difficult due to the high temperature conditions that exist within the conduit. Ideally, a vibration sensor would be mounted in a transmitter housing that is attached to the thermowell to allow for more measurement flexibility. However, in many applications, the transmitter is remotely mounted from the thermowell.

Figure 1:
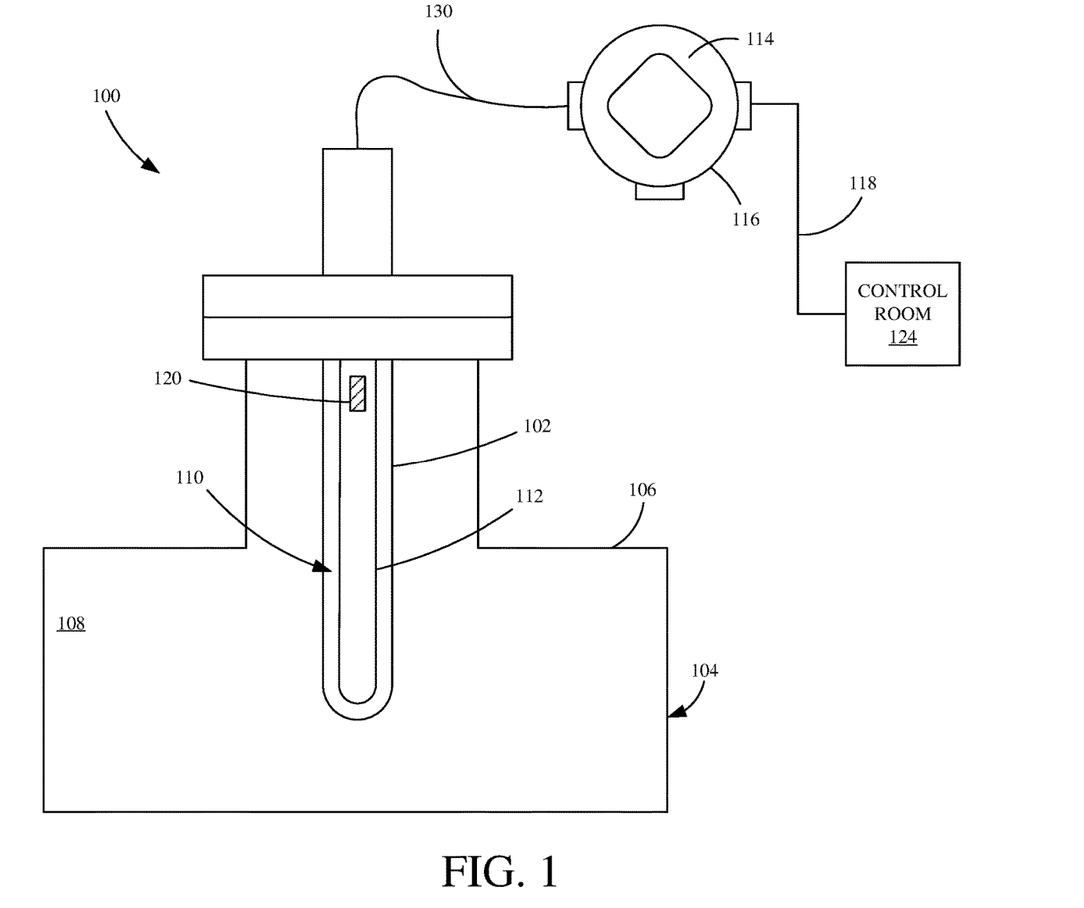
FIG. 1 is a diagrammatic view of a process fluid temperature measurement system with which embodiments of the present invention are particularly applicable.

FIG. 1 is a diagrammatic view of a process fluid temperature measurement system with which embodiments of the present invention are particularly applicable. As illustrated, system 100 generally includes a thermowell 102 configured to couple to a process fluid conduit 104 and extend through a wall 106 of the process fluid conduit. Thermowell 102 is further configured to contact process fluid 108 within process fluid conduit 104 in order to obtain measurements of the process fluid, such as temperature. Thermowell 102 has a temperature sensor assembly 110 generally disposed therein. The temperature sensing assembly 110 comprises a sensor capsule 112. The term "capsule" is not intended to imply any particular structure or shape and can thus be formed in a variety of shapes, sizes and configurations. Sensor capsule 112 generally includes one or more temperature sensitive elements (not shown), such as resistance temperature devices (RTDs) or thermocouples. Sensors within sensor capsule 112 are electrically connected to transmitter circuitry 114 within housing 116, which is configured to obtain one or more temperature measurements from sensor capsule 112. As shown, in one embodiment, sensor capsule 112 is electrically connected to transmitter circuitry 114 via measurement wiring 130, which can include a two or more conductor cable. Also, as shown, transmitter circuitry 114 is electrically connected to a host system within a control room 124 via a transmission loop 118 illustrated as a wire cable. Alternatively, transmission loop 118 may be a two or more wire cable, a fiber optic cable, or a wireless link.

Temperature sensor assembly 110 also includes vibration sensor 120 coupled to sensor capsule 112. Vibration sensor 120 is generally configured to sense vibration of thermowell 102 in response to conditions of the process fluid and produce a vibration signal in response to the detected vibration. For example, if vortices are produced within the process fluid and cause vibration of the thermowell, vibration sensor 120 is configured to sense the vibration and produce a vibration signal indicative of the vibration of the thermowell. As shown in FIG. 1, in one embodiment, vibration sensor 120 is disposed on sensor capsule 112 and located at the base of thermowell 102. By disposing vibration sensor 120 at the base of thermowell 102, vibration of thermowell 102 may be sensed at a point where fracture is likely to occur as a result of the vibration. Alternatively, vibration sensor 120 may be positioned at other locations of the thermowell such that vibration may be detected. Further, while it is shown in FIG. 1 that vibration sensor 120 is disposed in sensor capsule 112, vibration sensor 120 may, in other embodiments, be embedded within the thermowell and disposed proximate the sensor capsule.

Figure 2:
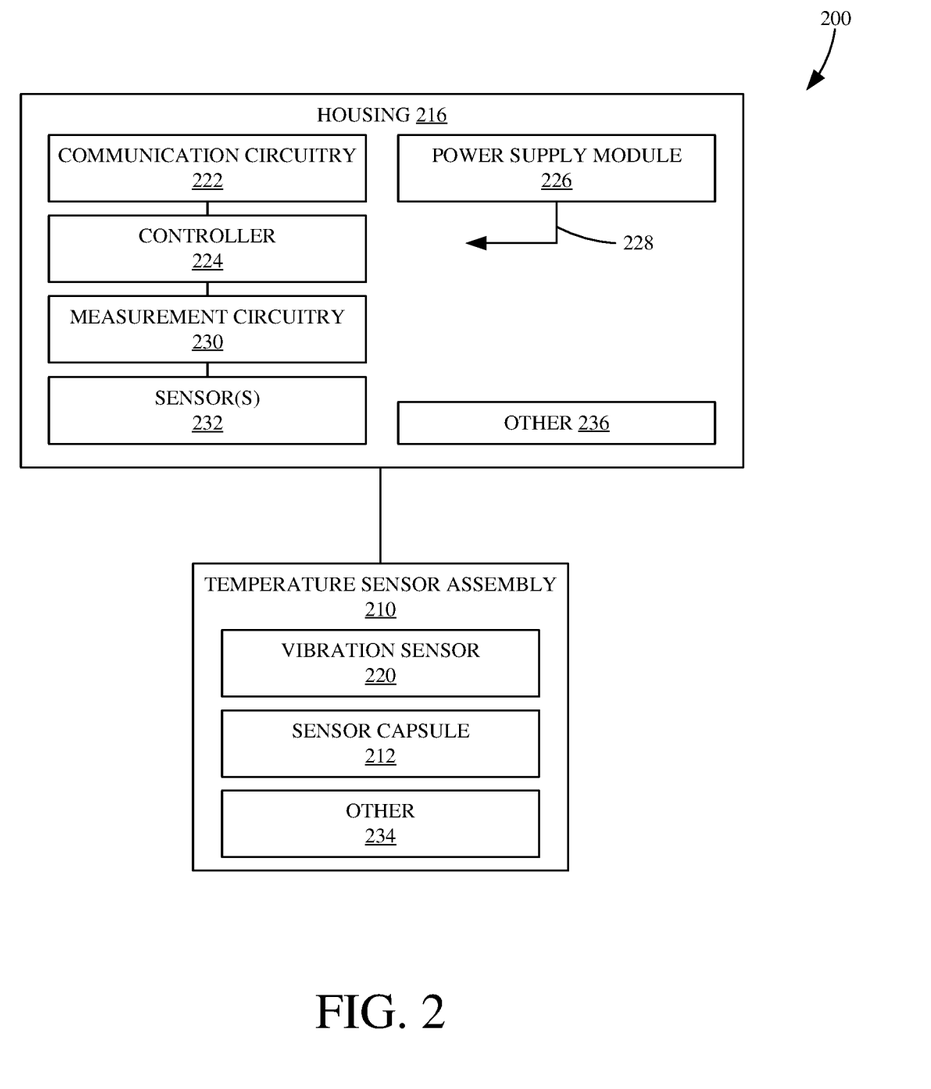
FIG. 2 is a block diagram of circuitry within housing of a process fluid temperature measurement system, with which embodiments of the present invention are particularly applicable.

FIG. 2 is a block diagram of circuitry within housing 216 of process fluid temperature measurement system 200, with which embodiments of the present invention are particularly applicable. System 200 bears some similarities to system 100 (shown in FIG. 1) and like components are numbered similarly. System 200 can also include other items as well, as indicated by block 236. System 200 includes communication circuitry 222 coupled to controller 224. Communication circuitry 222 can be any suitable circuitry that is able to convey information regarding the process fluid temperature and/or vibration of the thermowell, such as thermowell 102 (shown in FIG. 1). Communication circuitry 222 allows process fluid temperature measurement system 200 to communicate a process fluid temperature output over a process communication loop or segment, such as transmission loop 118 (shown in FIG. 1). Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591). Communication circuitry 222 also allows vibration sensor 220 within temperature sensor assembly 210 to communicate vibration signals in response to thermowell vibration over a process communication loop or segment, such as transmission loop 118 and/or measurement wiring 130.

System 200 also includes power supply module 226 that provides power to all components of system 200 as indicated by arrow 228. In embodiments where system 200 is coupled to a wired process communication loop, such as a HART® loop or FOUNDATION™ Fieldbus segment, power module 226 may include suitable circuitry to condition power received from the loop or segment to operate the various components of system 200. Accordingly, in such wired process communication loop embodiments, power supply module 226 may provide suitable power conditioning to allow the entire device to be powered by the loop to which it is coupled. In other embodiments, when wireless process communication is used, power supply module 226 may include a source of power, such as a battery and suitable conditioning circuitry.

Controller 224 is communicatively coupled to communication circuitry 222 and includes any suitable arrangement that is able to generate a temperature output using measurements from sensor(s) within sensor capsule 212. In one example, controller 224 is a microprocessor. Additionally, controller 224 includes any suitable arrangement that is able to generate a vibration output indicative of thermowell vibration detected and measured from vibration sensor 220, such as a vibration that meets the natural frequency of the thermowell. The output may be provided to a control room, such as control room 124 (shown in FIG. 1). Alternatively, or additionally, the output may be provided to an operator, machine, or other device. In one embodiment, the output is a visual output indicative of thermowell vibration. However, in other embodiments, the output may be an auditory output.

Measurement circuitry 230 is coupled to controller 224 and provides digital indications with respect to measurements obtained from sensors 232 and vibration sensor 220. Measurement circuitry 230 can include one or more analog-to-digital converters and/or suitable multi-plexing circuitry to interface the one or more analog-to-digital converters to vibration sensor 220. Additionally, measurement circuitry 230 can include suitable amplification and/or linearization circuitry as may be appropriate for the various types of vibration sensors and other sensors employed.

Temperature sensor assembly 210 illustratively includes sensor capsule 212, vibration sensor 220, and can include other items as well, as indicated by block 234. Vibration sensor 220 is coupled to the electronic circuitry of system 200 and is used to sense thermowell vibration in response to process conditions within the process fluid and produce a vibration signal in response to detected vibration of the thermowell. For example, if vortices produced by the process fluid within the conduit meet a particular frequency or magnitude, a vibration signal is produced and communicated to the electronic circuitry of system 200 to produce an output based on the vibration signal indicative of the vibration. In one embodiment, a vibration signal is produced only when a frequency threshold is met by the thermowell vibration. The frequency threshold may comprise a broad range of frequency signals indicative of thermowell vibration. For example, the frequency threshold may be the vortex-shedding frequency, that is, a frequency level capable of causing potential damage to the thermowell. Alternatively, or additionally, the frequency threshold may be the natural frequency of the thermowell under vibration or may be an alternative vibration frequency capable of being detected by vibration sensor 220.

Figure 3:
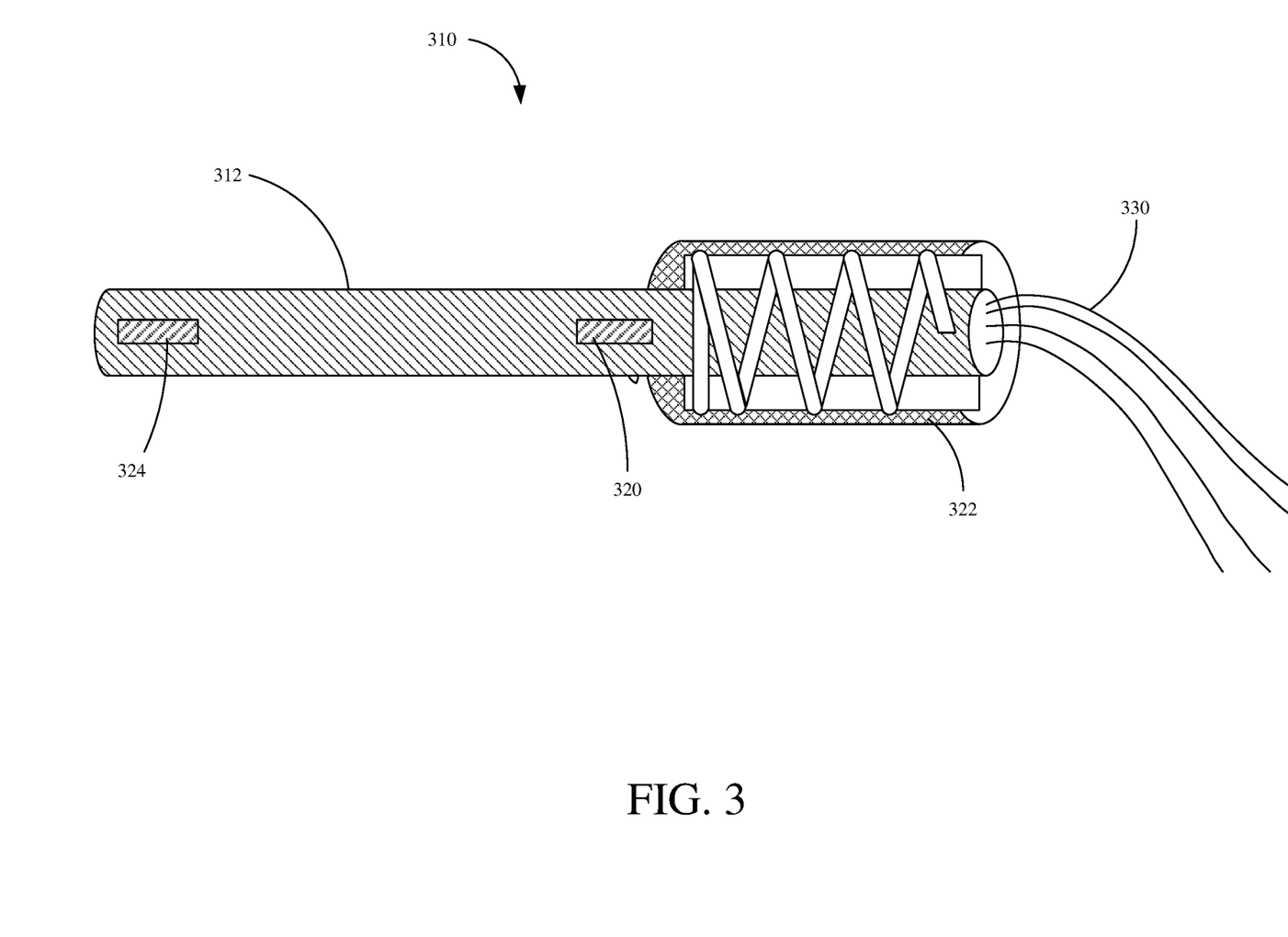
FIG. 3 is a diagrammatic view of a temperature sensor assembly in accordance with an embodiment of the present invention.

FIG. 3 is a diagrammatic view of a temperature sensor assembly in accordance with an embodiment of the present invention. Assembly 310 bears some similarities to temperature sensor assembly 110 (shown in FIG. 1) and like components are numbered similarly. In particular, temperature sensor assembly 310 includes sensor capsule 312 that is urged against an outer surface of the process fluid temperature measurement system via adapter 322. As shown in FIG. 3, adapter 322 is a threaded adapter. However, in alternative embodiments, adapter 322 may be a spring adapter or other suitable mechanical element. Additionally, sensor capsule 312 is electrically coupled to electronic circuitry of the process fluid temperature measurement system in order to generate an output indicative of process fluid temperature and/or detected vibration. Sensor capsule 312 is electrically coupled to electronic circuitry via measurement wiring 330.

Sensor assembly 310 includes one or more temperature sensor element 324, such as one or more resistance temperature devices (RTDs). Temperature sensor element 324 is coupled to sensor capsule 312, which is configured to obtain one or more temperature measurements within the process fluid conduit. The one or more temperature measurements are responsively sent as signals to the electronic circuitry of the process fluid temperature measurement system (not shown) to be produced as a temperature measurement output.

Also included in temperature sensor assembly 310 is vibration sensor 320. Vibration sensor 320 is coupled to sensor capsule 312 and is configured to produce a vibration signal in response to detected vibration of the thermowell. As shown in FIG. 3, vibration sensor 320 is disposed on sensor capsule 312 near the base of the sensor capsule, and accordingly, near the base of the thermowell. However, in other embodiments, vibration sensor may be disposed on different areas of sensor capsule 312 or disposed within the thermowell proximate sensor capsule 312. Vibration sensor 320 may alternatively be embedded at other locations of the thermowell where vibration may be detected. For example, vibration sensor 320 may be placed in a housing (not shown) in installations where the electronic circuitry is coupled to adapter 322.

By placing vibration sensor 320 at the base of the thermowell, where the majority of vibrational stress is located and where fracture is likely to occur, vibration sensor 320 may sense certain vibrational frequencies and magnitudes that could be potentially damaging to the thermowell, for example a vortex-shedding frequency produced by process fluid within the conduit. In response to detected vibration, vibration sensor 320 may provide a vibration signal to be used to provide an output. Additionally, embodiments described herein may also sense different vibrational frequencies of the thermowell, such as when the vibration equates to the natural frequency of the thermowell or an alternative frequency. In one embodiment, a vibration signal is produced only when the detected vibration meets a frequency threshold.

Vibration sensor 320 is further configured to sense vibration at an initial frequency, corresponding to normal process fluid flow. When process conditions change and cause significant vibration to the thermowell, vibration sensor 320 detects the vibration at the higher harmonic frequency, indicative of the vibration. In this way, vibration sensor 320 can sense vibration at a first frequency and sense vibration at a higher harmonic frequency corresponding to a vibration of the thermowell, the higher harmonic frequency being indicative of a different vibration state. For example, in one embodiment, the higher harmonic frequency detected may correspond to a change in vibration state from an in-line to a transverse direction. When the vibration state undergoes this transition, indicative of thermowell vibration, vibration sensor 320 may detect the transition to the transverse direction and produce a vibration signal in response.

Vibration sensor 320 is configured to produce a vibration signal over measurement wiring 330 indicative of detected vibration. In one embodiment, vibration sensor 320 includes a piezoelectric material, for example a piezoelectric film. When vibration of the thermowell occurs within the process fluid temperature measurement system, the piezoelectric material will stress in response to the thermowell under vibration, causing it to be excited and couple noise along measurement wiring 330 at the frequency of the detected vibration. The signal corresponding to the frequency of the detected vibration is, in turn, received by electronic circuitry (not shown) to produce an output indicative of the vibration.

In another embodiment, vibration sensor 320 includes a triboelectric mechanism, for example a triboelectric wire. When vibration of the thermowell occurs within the process fluid temperature measurement system, two insulators included within the triboelectric mechanism will responsively rub against one another, developing a charge. As vibration of the thermowell increases in magnitude and/or frequency, the rate at which the two insulators move increases, thereby generating a higher charge quantity sufficient to produce a signal indicative of the detected vibration.

Figure 4A:
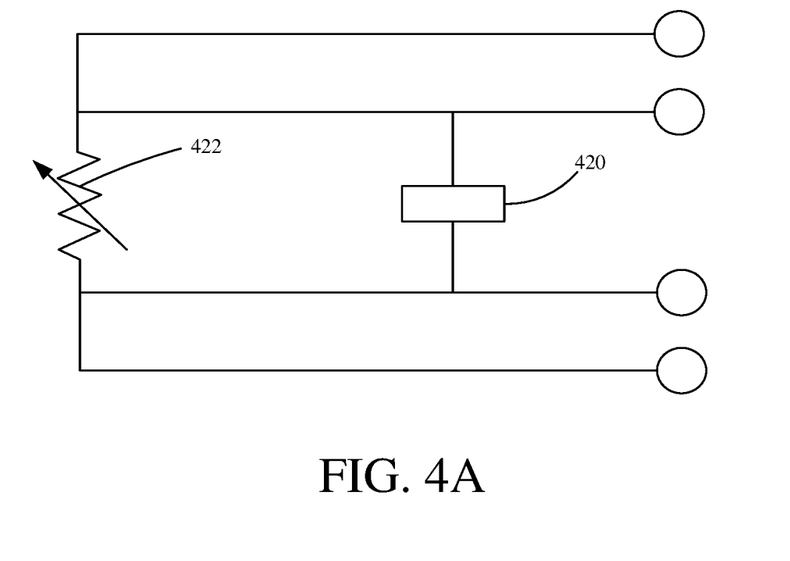
FIGS. 4A-4B illustrate a schematic diagram of a vibration sensor for the process fluid temperature measurement system of FIG. 1 in accordance with an embodiment of the present invention.
Figure 4B:
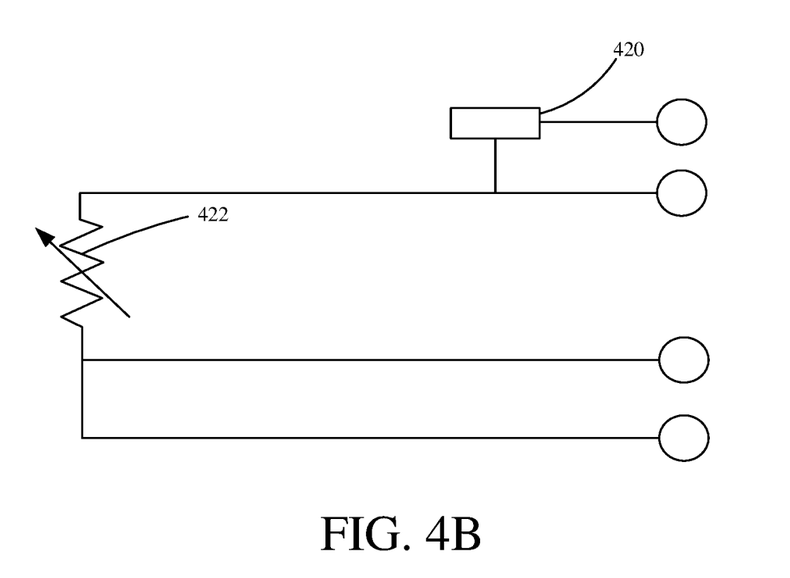

FIGS. 4A-4B illustrate a schematic diagram of a vibration sensor for the process fluid temperature measurement system of FIG. 1 in accordance with an embodiment of the present invention. As shown in FIGS. 4A-4B, vibration sensor 420 illustratively includes a piezoelectric material. In another embodiment, however, vibration sensor 420 may include a triboelectric mechanism, or other sensor capable of detecting vibration of a thermowell within the process fluid temperature measurement system.

FIG. 4A particularly illustrates vibration sensor 420 coupled to existing measurement wiring of the process fluid temperature measurement system (not shown), and resistor 422. Resistor 422 may be, for example, a resistance temperature device (RTD). As shown in FIG. 4A, a 4 wire RTD is utilized. However, in other embodiments, resistor 422 may be a 3 wire RTD. Because temperature changes slowly over time in a process fluid conduit, temperature signals acquired by sensors within the sensor capsule are nearly direct current (DC) signals. In contrast, vibration detected by thermowells within the process fluid temperature measurement system and the vibration signals produced by vibration sensor 420 are presented as an alternating current (AC) signal. The difference in signal production between vibration sensor 420 and sensors within the sensor capsule allows the electronic circuitry within the temperature measurement system to distinguish measurements and signal outputs for both the one or more temperature sensor elements and vibration sensor 420. In this way, vibration sensor 420 may produce a vibration signal along the existing measurement wiring typically used for the one or more temperature sensor element.

FIG. 4B particularly illustrates vibration sensor 420 coupled to separate measurement wiring of the process fluid temperature measurement system, and resistor 422. Resistor 422 may be, for example, a resistance temperature device (RTD). In this example, a 3 wire RTD is utilized. As shown, a separate wire may couple vibration sensor 420 to electronic circuitry within the temperature measurement system (not shown). Because the vibration signal produced by vibration sensor 420 is generally low in magnitude, the use of additional wiring may be utilized to eliminate the possibility of the vibration signal from being impacted by a low impedance from the signals produced by sensors within the sensor capsule. In this way, vibration sensor 420 may couple to measurement wiring separate from the measurement wiring used for the one or more temperature sensor element.

Figure 5:
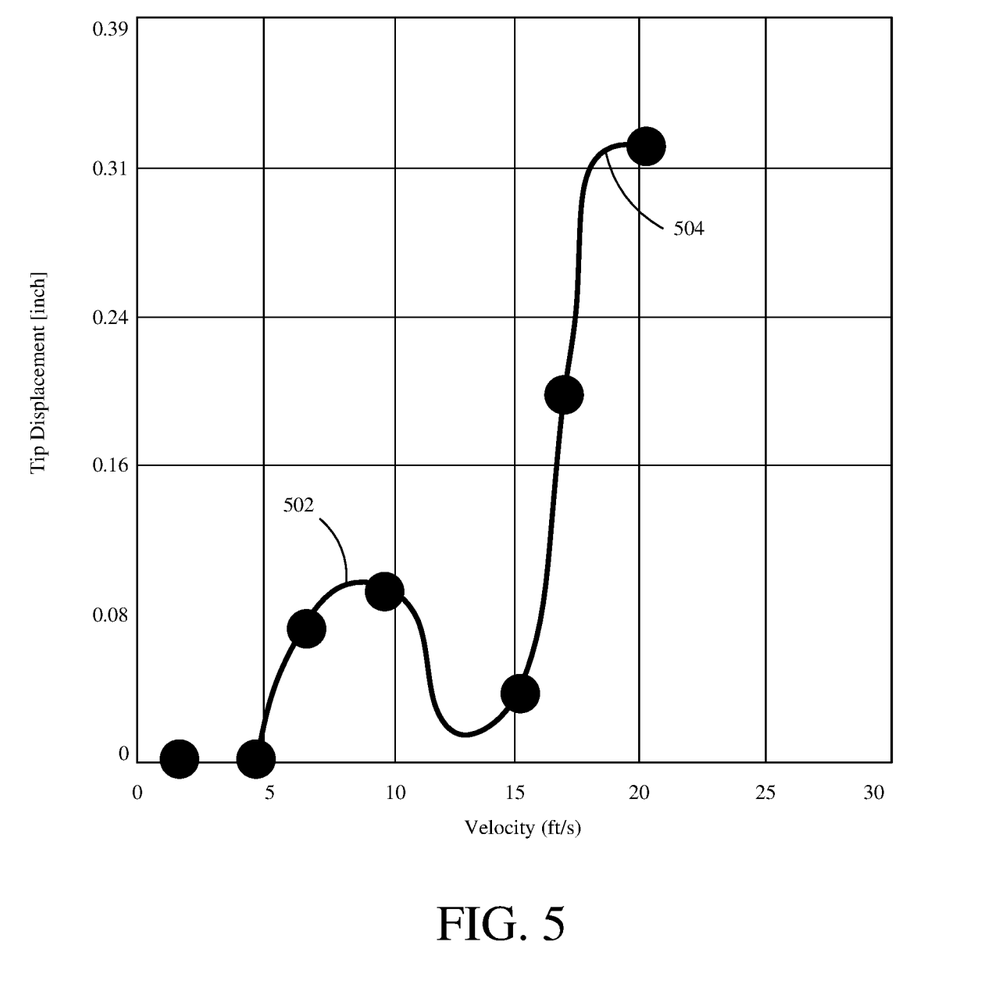
FIG. 5 is a chart showing thermowell tip displacement as velocity of process fluid flow varies.

FIG. 5 is a chart showing thermowell tip displacement as velocity of process fluid flow varies. The data shown in FIG. 5 is illustrative of a condition when process fluid is flowing. The data shows a difference between a first vibration state, as indicated at reference numeral 502, and a second vibration state, as indicated at reference numeral 504, with respect to process fluid velocity. As shown, as fluid velocity increases, thermowell tip displacement generally increases, indicative of a change in vibration state. For example, when the velocity of process fluid flow reaches 15 ft/s, the conversion of vibration state from an in-line to transverse direction is shown. The sudden shift in vibration state in turn significantly increases thermowell tip displacement, thereby increasing thermowell vibration and producing a vibration at a higher harmonic frequency. The change in thermowell vibration, corresponding to a different vibration state, is therefore detectable by a vibration sensor, such as vibration sensor 320 described above with regard to FIG. 3. Additionally, while the change of vibration state is illustratively shown at 15 ft/s, it is expressly contemplated that the change in vibration state may occur at varying process fluid velocity, and such a conversion may be detected by vibration sensor 320.

Figure 6A:
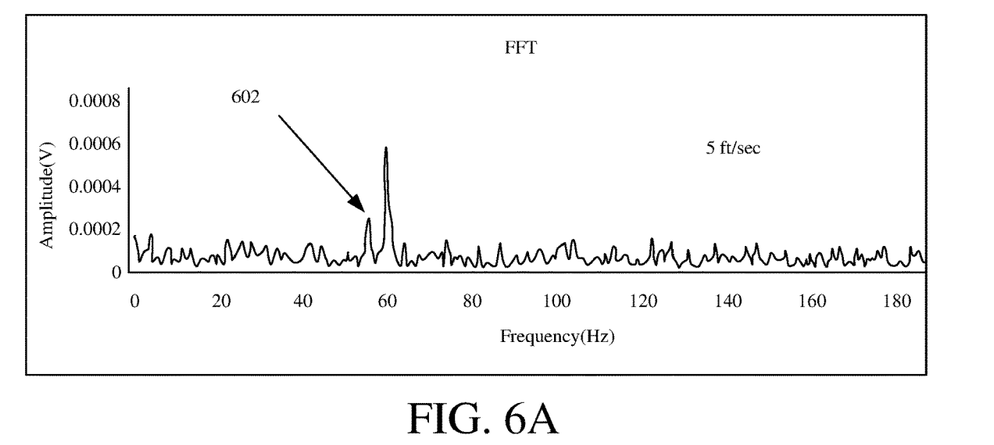
FIGS. 6A-6F illustrate a series of frequency domain plots at various process fluid flow rates for the signal output of a vibration sensor consistent with an embodiment of the present invention.
Figure 6B:
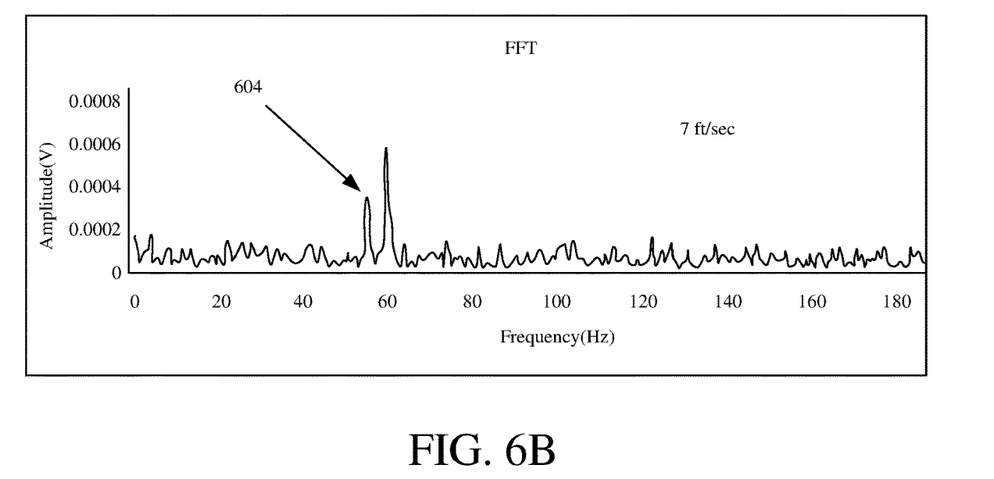
Figure 6C:
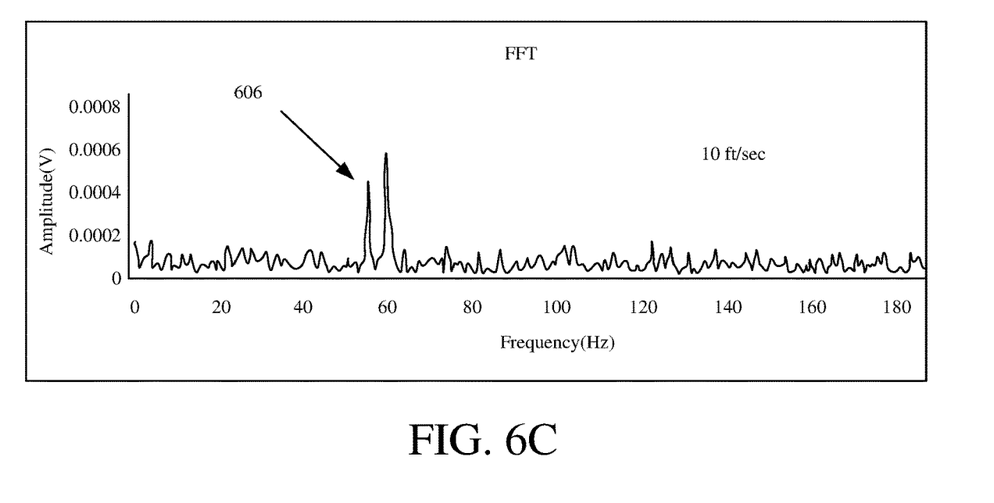
Figure 6D:
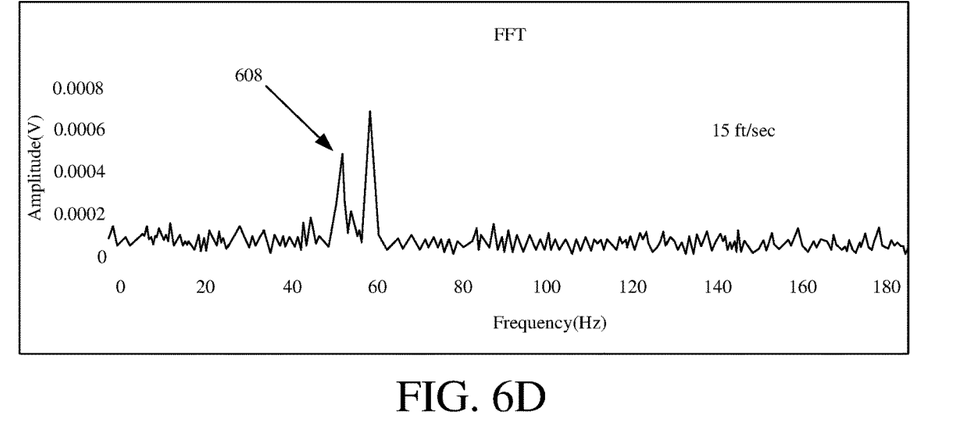
Figure 6E:
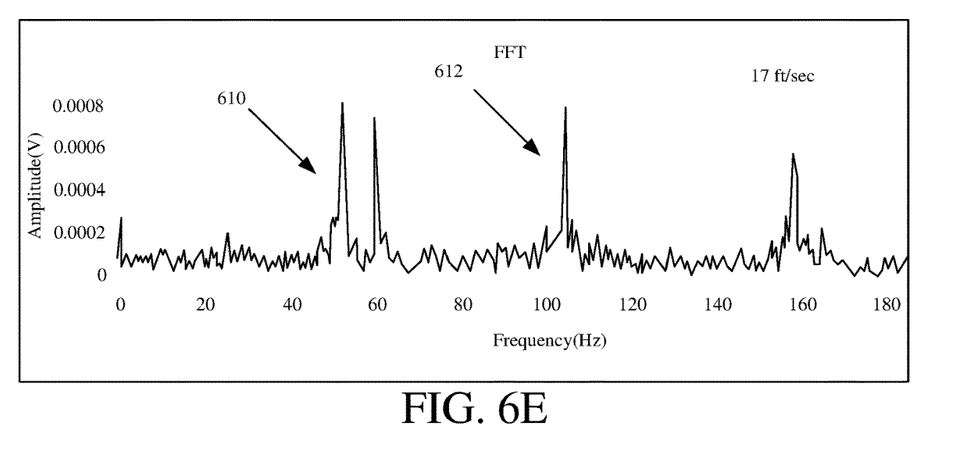
Figure 6F:
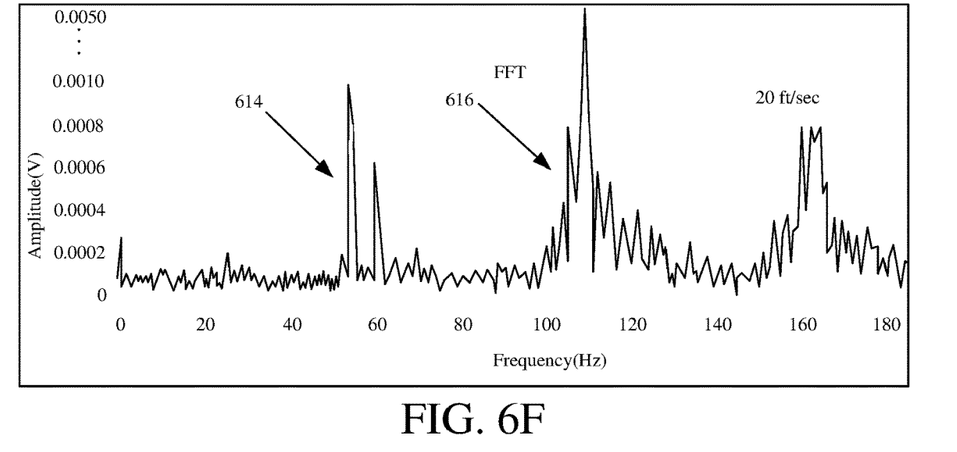

FIGS. 6A-6F illustrate a series of frequency domain plots at various process fluid flow rates for the signal output of a vibration sensor consistent with an embodiment of the present invention. The data shown in FIGS. 6A-6F are illustrative of a condition when process fluid flow is flowing at varying flow rates. As shown, as the flow rate increases, the vibration magnitude at the natural frequency of the thermowell increases. For example, as shown in FIG. 6A, the signal output at a flow rate of 5 feet per second (ft/sec) is indicated generally at reference numeral 602. As the flow rate increases, for example to 7 ft/sec, as shown in FIG. 6B, the vibration magnitude and output signal of the vibration sensor increases, indicated generally by reference numeral 604. As flow rate continues to increase, the vibration magnitude at the natural frequency increases, and therefore the signal output by the vibration sensor responsively increases. As shown generally in FIGS. 6C-6F at reference numerals 606-616, the output signal of the vibration sensor corresponding to a higher vibration magnitude at the natural frequency increases with an increasing flow rate, for example to 10 ft/sec, 15 ft/sec, and 17 ft/sec. Finally, as shown in FIG. 6F, the magnitude of vibration detected and the output signal are most significant, indicated by reference numerals 614 and 616, corresponding to, respectively, 1 mV and 5 mV at a flow rate of 20 ft/sec. Additionally, while varying flow rates of 5 ft/sec, 7 ft/sec, 10 ft/sec, 15 ft/sec, and 20 ft/sec are used in this example, it is expressly contemplated that the detection of thermowell vibration and production of a vibration signal output may occur at different process fluid flow rates.

Although the present invention has been described with reference to preferred embodiments, workers skilled in the art will recognize that changes may be made in form and detail without departing from the spirit and scope of the invention.

What is claimed is:

1. A process fluid temperature measurement system comprising:
   a thermowell configured to couple to a process fluid conduit and extend through a wall of the process fluid conduit;
   a temperature sensor assembly disposed within the thermowell, the temperature sensor assembly including:
     a sensor capsule having at least one temperature sensitive element disposed therein;
     a vibration sensor mounted to the sensor capsule, the vibration sensor being configured to produce a vibration signal in response to detected vibration; and
   transmitter circuitry coupled to the vibration sensor and the at least one temperature sensitive element, the transmitter circuitry being configured to receive the vibration signal and produce an output based at least on the received vibration signal.

2. The process fluid temperature measurement system of claim 1, wherein the vibration sensor includes a piezoelectric film.

3. The process fluid temperature measurement system of claim 1, wherein the output is indicative of thermowell stress from a vortex-shedding frequency produced by a process fluid.

4. The process fluid temperature measurement system of claim 3, wherein the transmitter circuitry is configured to produce the output when the vortex-shedding frequency meets a frequency threshold.

5. The process fluid temperature measurement system of claim 1, wherein the vibration signal includes an indication of the frequency of vibration.

6. The process fluid measurement system of claim 1, wherein the vibration signal includes an indication of the magnitude of the vibration.

7. The process fluid temperature measurement system of claim 1, wherein the transmitter circuitry is coupled to the vibration sensor via measurement wiring.

8. The process fluid temperature measurement system of claim 7, wherein the sensor capsule is also coupled to the transmitter circuitry via the measurement wiring.

9. The process fluid temperature measurement system of claim 7, wherein the vibration signal is generated along the measurement wiring used for the at least one temperature sensitive element.

10. The process fluid temperature measurement system of claim 1, wherein the vibration sensor is disposed within the sensor capsule at a base of the thermowell.

11. The process fluid temperature measurement system of claim 1, wherein the vibration sensor includes a triboelectric wire.

12. A process fluid temperature measurement system comprising:
   a thermowell configured to couple to a process fluid conduit and extend through a wall of the process fluid conduit;
   a temperature sensor assembly disposed within the thermowell, the temperature sensor assembly including:
     a sensor capsule having at least one temperature sensitive element disposed therein;
     a piezoelectric film disposed within the sensor capsule and at a base of the thermowell, the piezoelectric film being configured to stress with the thermowell to produce a vibration signal in response to detected vibration; and transmitter circuitry coupled to the piezoelectric film and configured to receive the vibration signal and produce an output indicative of the vibration.

* * * * *